United States Patent Office 3,144,368

Patented Aug. 11, 1964

3,144,368

POWDERLESS ETCHING

Phillip M. Daugherty, Decatur, Ga., and Henry C. Vaughn, North Palm Beach, Fla., assignors to Photo-Engravers Research, Inc., Savannah, Ga., a corporation of Georgia No Drawing. Filed Dec. 28, 1961, Ser. No. 162,969
5 Claims. (Cl. 156—14)

This invention relates to the etching of photoengraving copper. More particularly, it relates to powderless etching such as is described in Jones Patent 2,746,848, issued May 22, 1956.

This application is a continuation-in-part of our copending application Serial No. 732,419, filed May 2, 1958, now U.S. Patent No. 3,033,725.

Photoengraving copper printing plates, which can be copper or brass, are made by depositing a photosensitive film on the plate, impressing on the film the image to be printed by exposing the film to light passed through a negative of the image, removing the unexposed film (which overlies the image area), and providing the remainder of the film (which serves to define the image area) in a hardened and acid resistant condition by chemically treating or by baking this portion of the film. The plate is then contacted with an etching solution, and the solution attacks the copper of the image area, but not the copper covered by the acid resistant coating, whereby the image is provided in relief on the plate.

From a consideration of the foregoing, it will be readily apparent that in order to accurately produce the image on the plate, it is necessary to control the extent to which the etching solution etches the sidewalls which form about the periphery of the image area as the etching progresses. With respect to etching of the sidewalls, this can be considered as involving two actions on the sidewalls. One of these is the reduction of printing area due to sidewall etching and is referred to or measured as "etch factor," and the other is "undercutting action" which is the tendency for removal of metal from beneath edge portions of the said acid resistant coating. Etch factor is the ratio of depth of etch remote from the sidewall to sidewall etch at the printing surface (i.e. the surface contacting the acid resistant coating). As to undercutting, speaking in reference to the etching of type characters, in the case of actual undercutting, the base of the characters would be narrower than the printing surface for the characters. Actual undercutting is undesirable; a right angle sidewall is suitable but in general is not a practical condition to maintain. Rather, in general, some inward slope is tolerable, but the inward slope should not be excessive so as to significantly reduce the image area in relief.

To provide a suitable etch factor and control undercutting, the Jones patent teaches including thiourea in the etching solution. The thiourea causes formation of a protective film over the sidewalls, and this film tends to prevent unwanted action of the etching solution on the sidewalls. The formation of a film over the image area to be etched, which film would interfere with the etching, is prevented by abrading the image area during the etching. The abrading can be effected as an incident of the contacting of the etching solution and the copper by directing a spray of the etching solution at the image area, the velocity of the spray being sufficient to provide the desired abrading action. Alternatively, the abrading can be by brushing the etching solution into contact with the copper of the image area. The abrading, of course, is such that the protective film formed over the sidewall is not removed.

Thus, in the process of the Jones patent, photoengraving copper is etched to make therein an image in relief by contacting the copper in the image area with a ferric chloride etching solution to make an image in relief therein, and there is included in the solution thiourea to cause formation of a protective film about the periphery of the image area to provide a suitable etch factor and control undercutting. The etching solution used in the Jones process is a ferric chloride aqueous solution as is known in the art for etching of photoengraving copper. The solution can be 26–46° Bé., and is commonly 30–42° Bé.

The Jones process is termed "powderless etching" in contradistinction to the older process where sidewalls were protected by periodically interrupting the etching, powdering the sidewalls and firing the powdered sidewalls to "burn-on" a protective film.

In practicing the process of the Jones patent, it has been found that whereas sidewall protection is provided as is disclosed therein, yet the operation of the bath in providing sidewall protection is not reproducible so as to be suitable for widespread commercial application.

It has been discovered that improvement is realized in the Jones process if the etching solution, after the addition of thiourea, is aged before being used for etching. This is contrary to a teaching of the Jones patent, since therein it is taught that fresh solutions are best suited for the purpose of the process. While Jones spoke of aged as well as fresh solutions, the advantage of aged solutions went unrecognized.

The advantage realized by using an aged solution is that the sidewall protection obtained is more reproducible.

This advantage can be utilized by aging a ferric chloride etching bath to which thiourea has been added, before initial use of the bath. Further, since the bath becomes depleted in thiourea (or loses its protective film forming property) before the bath becomes spent in etching power, and the protective film forming property can be restored by addition of thiourea, the discovery of the desirability of aging can be employed to advantage by using aged solution to provide thiourea make-up as is required during the life of the bath.

Thus, in powderless etching using thiourea and wherein make-up thiourea is added to the solution following initial use of the solution to maintain the operation of the thiourea of providing a protective film, the present invention provides the step which comprises adding the make-up thiourea to fresh ferric chloride aqueous solution, allowing the fresh ferric chloride solution containing the thiourea to age, and adding aged solution to the etching solution to maintain the operation of the thiourea of providing a protective film.

The improvement upon aging is progressive with time. Aging for at least about 1 hour is desirable, and aging for at least 1–2 hours is recommended. Aging can be for longer periods and, indeed can be for 36 hours. Such prolonged aging times, as 36 hours however, may give rise to operating inconvenience. Commonly, a practical aging time will be about 1–10 hours.

In utilizing the improvement of the invention, thiourea can be added to fresh aqueous ferric chloride solution, the thiourea containing solution can be aged for the time desired and can thereafter be added as and when required to maintain the desired condition of the etching solution.

By "fresh ferric chloride solution" is meant solution which has not been used for etching, rather than a recently prepared ferric chloride solution. The fresh solution can be of strength as is suitable for etching, which is about 26–46° Bé. Preferably it is about 30–35° Bé. The amount of thiourea added to the fresh ferric chloride can be about 20–50 grams per liter, and is preferably 30–40 grams per liter. While less than 20 grams per liter could be used, this would require addition of an excessive amount of make-up solution to provide the required thiourea addition. As the upper limit, this would be the solubility of the thiourea in the ferric chloride solution used.

By "aging" is meant delaying initial use for etching of the aqueous ferric chloride solution, following addition of the thiourea to the solution.

The life of ferric chloride etching solution, i.e. the time interval during which it can be used for etching and before it becomes spent by reason of loss of etching or copper dissolving power, depends on the use thereof for etching. Commonly, the life of an etching solution is one working day, and the photoengraver makes up a new bath each morning. During the life of the bath it can be replenished with thiourea as is required in order to provide suitable sidewall protection. The etching time for the individual plates ranges from 1–15 minutes, usually 2–8 minutes. The condition of the bath insofar as need for replenishment in thiourea is concerned, can be gauged by observation of the performance of the bath in providing the sidewall protection, either on production plates or on test plates.

*Example*

To a 30° Bé. ferric chloride aqueous solution there is added 2.0 grams per liter of thiourea. The resulting solution is allowed to age for 36 hours, at room temperature, and is thereafter used as an etching bath for various etching tasks which are performed at irregular intervals. During the life of the bath test plates having resist coatings to permit etching in 0.020 inch circles are subjected to the etching action for 3 minutes at one hour intervals. Make-up solution is added as is necessary to maintain the bath in condition to provide suitable sidewall protection. The make-up solution is formed by adding thiourea to fresh 30° Bé. aqueous ferric chloride solution in amount of 35 grams of thiourea per liter, and allowing the thiourea-containing solution to age for at least 1 hour. The make-up solution is maintained in a container connected to the tank containing the etching bath by a valved pipeline, and following addition of the make-up solution, the bath is stirred briefly to distribute the make-up solution.

While the invention has been described with reference to particular embodiments thereof, modifications and variations will occur to those skilled in the art, and it is desired to secure by these Letters Patent all such alterations.

What is claimed is:

1. In a process for etching photoengraving copper wherein said photoengraving copper is contacted with ferric chloride etching solution to make an image in relief thereon and wherein thiourea is incorporated in said ferric chloride etching solution for control of undercutting, wherein the ferric chloride solution becomes partially spent, the improved process for replenishing the effectiveness of the spent etching solution which comprises forming a makeup solution by adding thiourea to fresh ferric chloride in an aqueous solution, allowing the fresh ferric chloride solution containing thiourea to age for a period of at least about 1 hour, and then adding the aged solution to said partially spent ferric chloride solution to maintain the effectiveness of said etching solution.

2. The process of claim 1, wherein the make-up thiourea is added to the fresh ferric chloride aqueous solution in amount of about 20–50 grams per liter of the fresh solution, and the fresh solution is about 20–35° Bé.

3. In a process for etching photoengraving copper wherein said photoengraving copper is contacted with ferric chloride etching solution to make an image in relief thereon and wherein thiourea is incorporated in said ferric chloride etching solution for control of undercutting, wherein the ferric chloride solution becomes partially spent, the improved process for replenishing the effectiveness of the spent etching solution which comprises forming a makeup solution by adding thiourea to fresh ferric chloride in an aqueous solution, allowing the fresh ferric chloride solution containing thiourea to age for a period of 1 to 10 hours, and then adding the aged solution to said partially spent ferric chloride solution to maintain the effectiveness of said etching solution.

4. The improvement of claim 3, wherein said fresh ferric chloride solution is a 30 to 35° Bé ferric chloride solution, and 20 to 50 grams of thiourea per liter of said fresh ferric chloride solution is added thereto, the solution then being aged and subsequently added to the partially spent etching solution.

5. The improvement of claim 3, wherein said photoengraving copper is etched by splashing said etching solution against said plate.

References Cited in the file of this patent

UNITED STATES PATENTS 2,746,848 Jones ________________ May 22, 1956